Sept. 8, 1959  H. A. KULJIAN  2,903,166
LIQUID STORING AND LIQUID FLOW DISTRIBUTING
AND MODULATING DEVICE
Filed July 17, 1957

INVENTOR.
HARRY A KULJIAN
BY
Atty

United States Patent Office 2,903,166
Patented Sept. 8, 1959

2,903,166

LIQUID STORING AND LIQUID FLOW DISTRIBUTING AND MODULATING DEVICE

Harry A. Kuljian, Merion, Pa., assignor to The Kuljian Corporation, Philadelphia, Pa., a corporation of Pennsylvania Application July 17, 1957, Serial No. 672,384

2 Claims. (Cl. 222—478)

In various industrial processes, it is necessary to transfer a liquid from one point or receptacle to another point or receptacle. When the source of liquid is constant, the flow of liquid from a first receptacle to a second receptacle therebelow, can be readily regulated. When, however, the source of liquid is not constant, and where it is necessary that the transfer of liquid from a first receptacle to a second receptacle therebelow, be made proportional to the variable amount of liquid available from said source, regulation of the flow from the first to the second receptacle involves the use of complicated mechanical, or electromechanical controls, which are expensive to install and to service. For example, in a multi-stage heat exchange tower of the type used in electric power installations, the condensate which collects in the condenser is heat-exchanged with steam bled from the turbine, and/or with primary steam from the boiler, before the condensate is pumped back into the boiler. In such an arrangement, the condensate is transferred from the condenser to the uppermost of a number of open, or direct contact type stage heaters. Because the amount of condensate available at any given time varies with the operational load, the flow of the condensate through the successive stage heaters must be made proportional to the availability of the condensate. Heretofore, the practice has been to admit condensate to an upper stage heater and to provide complicated and expensive controls which were responsive to the liquid level of the liquid in said stage heater, for opening, or closing, multiway valves to permit, or to prevent, the flow of liquid from said stage heater, to the one below. Since this type is not fool proof it requires considerable maintenance expense and involves shutting down the turbine or other prime mover while the repair is being made.

It is therefore the object of my invention to produce a combined liquid distributor and liquid flow control, or modulating device whereby liquid can be transferred from one point to another, as in a multistage heat exchanger of the type above referred to, or in other types of apparatus, in approximate proportion to the availability of the liquid to be so transferred, even when the source of said liquid is not constant.

A further object of the invention is to provide a combined liquid distributor and liquid flow regulator which is inexpensive to make and install and which has no moving parts, whereby the expense of servicing, or maintenance, is greatly reduced or wholly eliminated.

These and other objects are attained by my invention as set forth in the following specification and as illustrated in the accompanying drawings in which.

Figure 1:
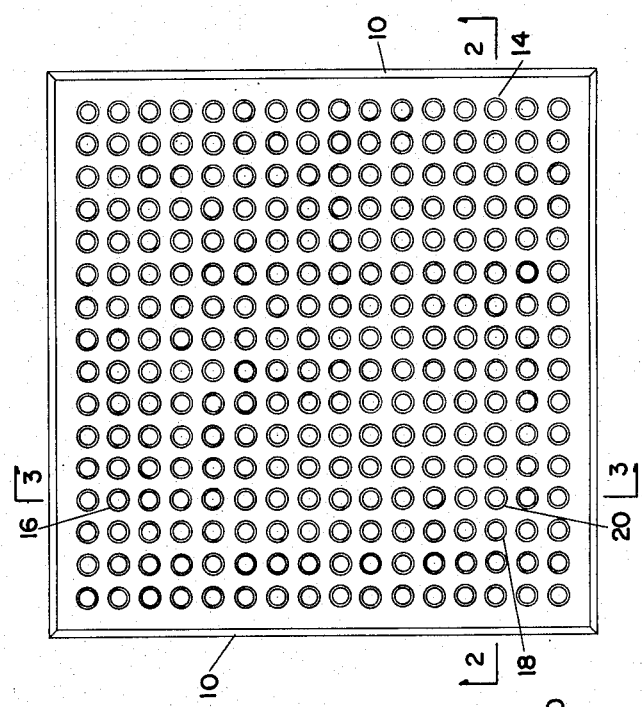
Fig. 1 is a top plan view of one embodiment of my invention.
Figure 2:
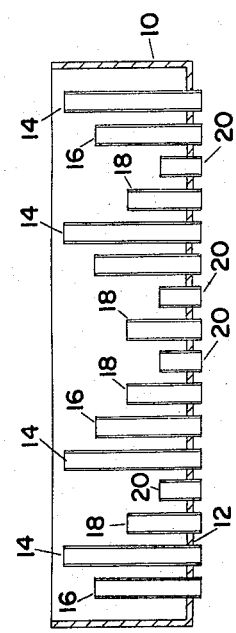
Fig. 2 is a vertical sectional view taken on line 2—2 on Fig. 1.
Figure 3:
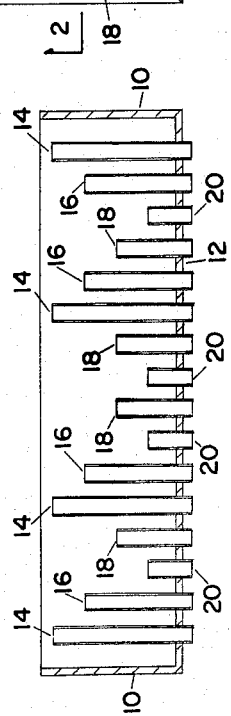
Fig. 3 is a vertical sectional view taken on line 3—3 on Fig. 1.

As will be seen from Figs. 2 and 3, a device embodying my invention includes a receptacle formed of side walls 10 and bottom wall 12 and made in any size or shape of the container.

The receptacle is provided with a repeating pattern of open ended pipes which are preferably of the same, but which may be of different capacities, but which are of different heights. By way of illustration, each receptacle will have a number of long pipes 14, a number of shorter pipes 16, and a number of still shorter pipes 18 and 20 and so on. The lower ends of all of the pipes serve to discharge liquid from the receptacle and may extend below, or terminate at, the bottom 12 of the receptacle and their upper ends are at various distances from the upper end of the receptacle. The liquid to be translated from a first, to a second, receptacle, is delivered into the first receptacle by any suitable means, not shown, and as many receptacles, such as that shown in Fig. 3, may be arranged in series flow relation. By this arrangement, the liquid initially introduced into any upper receptacle will not begin to flow into a lower receptacle until the level of the liquid in the upper receptacles submerges the upper ends of pipes 20. If the volume of the liquid entering the upper receptacle is substantially equal to the flow capacity of pipes 20, the level of the liquid in the receptacle will be stabilized or will remain substantially constant because the head above pipes 20 will increase the rate of flow through the pipes and vice versa. But, if the rate of flow of liquid into an upper receptacle increases perceptably, the level of the liquid in the receptacle will rise until the upper ends of pipes 18 are submerged and the liquid will now flow from the receptacle through pipes 18 and 20. Again, either a state of substantial equilibrium is reached, or the level of the liquid will fall below the upper ends of pipes 18, or the level of the liquid will rise until the upper ends of pipes 16, and, ultimately, the upper ends of pipes 14 are submerged. In other words, as the liquid level in a receptacle rises, the liquid will be discharged through a larger number of pipes.

Since, other things being equal, the flow of liquid through a pipe varies as the square root of 2GH, it follows that as the level rises above the upper ends of pipe 20, the rate of flow through pipe 20 will increase accordingly. But, when the level of the liquid rises above the level of pipe 18, the amount of liquid discharged from the modulator is increased by the flow capacity of pipes 18 and the rate of flow through pipes 20 is further increased and so on for pipes 16 and 14. Therefore, when the load is relatively small, the available condensate may only be enough to cover the lowermost pipes 20 and, as the load increases, the level of the liquid in the modulator rises, and the flow of condensate from the modulator is increased in such a manner that the average flow of condensate from the modulator will be at all times proportional to the average input of condensate into the modulator.

It will be seen that the modulator also provides storage to accommodate sudden large increments in condensate input, thus smoothing out the operational curve despite wide range fluctuation in the input. For example, if a large amount of condensate is suddenly admitted into the modulator, the amount of condensate in excess of the flow capacity of the pipes then submerged, is stored in the modulator and is discharged in increments which are a function of the flow capacity of the submerged pipes and 2GH. This makes it possible to admit condensate into the modulator in predetermined quantities and at predetermined intervals, which are related to the operational load which, in turn, means that an automatic valve can be used to control the flow of condensate into the modulator. For example, under a relatively low operational load, the valve which controls the input of condensate into the modulator will be set to open at relatively long intervals, and, as the operational load increases, the valve is set to open at shorter intervals. This makes it possible to eliminate the complicated and expensive control mechanisms which would otherwise be necessary to regulate the flow of condensate through a heat exchange tower in accordance with the fluctuations in the operational load. It will also be seen that the average flow of condensate will be proportional to the average input.

It will be seen that the device illustrated is very simple and wholly automatic and that, since it has no moving parts, it will need no servicing. Also because the water used in heat exchange towers, and certain other installations, is distilled or otherwise chemically treated, the deposit of various precipitates on the interior of the pipes is negligible, and it will take a long time before the interiors of the pipes are sufficiently encrusted perceptably to decrease the total flow capacity, and, even then, by correspondingly reducing the maximum flow of liquid into the first or uppermost of the series of receptacles, the clean out operation can be postponed. Furthermore, by initially making the pipes of a much larger flow capacity than the maximum that can possibly be needed, the time elapsing before cleaning becomes necessary will be greatly lengthened. Because the flow of liquid from an upper to a lower receptacle is, in the last analysis, controlled by the level of the liquid in the upper receptacle, enlarging the flow capacity of the pipes does not affect the operativeness of the device.

By way of illustrating the operation of the invention, let it be assumed that a number of receptacles are arranged in vertically spaced relation in a heat exchange tower, and that condensate is delivered to the uppermost of said receptacles as it becomes available in the condenser. When the steam turbine is operating at very reduced capacity, the amount of condensate available is correspondingly reduced and the liquid level in the uppermost receptacle will be relatively low, and vice versa. For example, if it is assumed that the liquid level in the upper receptacle is stabilized at a point somewhere between the upper ends of pipes 20 and pipes 18, it follows that liquid can only flow to a lower receptacle through pipes 20 and that its rate of flow will be the same as the rate of flow of liquid into said upper receptacle. Conversely, when the liquid level rises in an upper receptacle due to the increase in the amount of condensate available, the flow from the upper to a lower receptacle will increase proportionately.

What I claim is:

1. A device for storing and distributing liquid and for modulating the flow of a fluctuating liquid, said device including a receptacle having a bottom wall and a side wall defining a receptacle having a relatively large and substantial planar bottom area, therebeing a plurality of openings formed in the bottom wall of said receptacle, a first plurality of spaced pipes having their lower ends connected to a first corresponding number of said openings and having their upper ends at a first level above the bottom wall of said receptacle and a second plurality of pipes having their upper ends below the upper edge of said side wall and having their lower ends connected to a second corresponding number of said openings and having their upper ends disposed at a level above the level of the upper ends of said first plurality of pipes, whereby liquid introduced into said receptacle will first be distributed through said first set of pipes over a first area, and whereby liquid will also be simultaneously distributed through said second set of pipes over a second area when the rate of input of liquid into said receptacle exceeds the flow capacity of said first set of pipes, the portion of said receptacle between the upper ends of said first and said second plurality of pipes constituting a reservoir for accommodating a predetermined increment of liquid in said receptacle in excess of the flow capacity of said first plurality of pipes.

2. The structure recited in claim 1 in which said first and second plurality of pipes are distributed in alternate order over the area of the bottom wall of the receptacle.

References Cited in the file of this patent

UNITED STATES PATENTS

| 912,896 | Sauser | Feb. 16, 1909 |
| 1,139,129 | Lyons | May 11, 1915 |
| 2,582,523 | Beglinger | Jan. 15, 1952 |
| 2,648,981 | Drake | Aug. 18, 1953 |

FOREIGN PATENTS

| 249,121 | Germany | July 12, 1912 |
| 94,707 | Switzerland | May 16, 1922 |
| 74,392 | Holland | Apr. 15, 1954 |